(12) United States Patent
Hirai

(10) Patent No.: US 10,112,107 B2
(45) Date of Patent: Oct. 30, 2018

(54) IDENTIFICATION APPARATUS

(71) Applicant: Hidekuni Hirai, Urayasu (JP)

(72) Inventor: Hidekuni Hirai, Urayasu (JP)

( * ) Notice: Subject to any disclaimer, the term of this patent is extended or adjusted under 35 U.S.C. 154(b) by 0 days.

(21) Appl. No.: 15/670,846

(22) Filed: Aug. 7, 2017

(65) Prior Publication Data

US 2018/0133591 A1 May 17, 2018

(30) Foreign Application Priority Data

Nov. 11, 2016 (JP) .................................. 2016-220271

(51) Int. Cl.
*G07F 17/34* (2006.01)
*A63F 9/24* (2006.01)
(Continued)

(52) U.S. Cl.
CPC .................. *A63F 9/24* (2013.01); *A63F 1/04* (2013.01); *A63F 3/00643* (2013.01); *G09B 19/22* (2013.01); *A63F 2001/0475* (2013.01); *A63F 2003/00662* (2013.01); *A63F 2009/247* (2013.01); *A63F 2009/2411* (2013.01); *A63F 2009/2419* (2013.01); *A63F 2009/2438* (2013.01); *A63F 2009/2439* (2013.01); *A63F 2009/2442* (2013.01); *A63F 2009/2476* (2013.01)

(58) Field of Classification Search
USPC ......................................................... 463/36
See application file for complete search history.

(56) References Cited

U.S. PATENT DOCUMENTS

| 2006/0174130 | A1* | 8/2006 | Noble ..................... G06F 21/35 713/182 |
| 2009/0119516 | A1* | 5/2009 | Tanabiki ................. G06F 21/77 713/190 |

(Continued)

FOREIGN PATENT DOCUMENTS

| JP | 2013-000581 A | 1/2013 |
| JP | 5633858 B1 | 12/2014 |
| JP | 5787199 B1 | 9/2015 |

OTHER PUBLICATIONS

Jan. 31, 2017 Office Action issued in Japanese Patent Application No. 2016-220271.

*Primary Examiner* — Pierre E Elisca
(74) *Attorney, Agent, or Firm* — Oliff PLC

(57) ABSTRACT

An identification apparatus includes: a sensor face in which a plurality of sensor electrodes and a ground portion are provided on one and the same plane; wherein: a conductive portion or conductive portions formed in an identification object are configured so that when the identification object is placed on the sensor face, the conductive portion or the conductive portions can electrically connect a corresponding one or corresponding ones of the sensor electrodes with the ground portion; and a change of electrostatic capacitance occurring when the corresponding sensor electrode or electrodes are electrically connected with the ground portion is detected so that an ID of the identification object can be identified. Thus, it is possible to provide an identification apparatus which can be manufactured inexpensively without using expensive devices such as RFIDs and which is improved in terms of the degree of freedom for design.

8 Claims, 9 Drawing Sheets

(51) Int. Cl.
    *A63F 1/04*       (2006.01)
    *G09B 19/22*    (2006.01)
    *A63F 3/00*       (2006.01)

(56) References Cited

U.S. PATENT DOCUMENTS

2010/0062819 A1*   3/2010   Hannigan  ............. G06Q 30/02
                                                                                                 463/9
2017/0232348 A1*   8/2017   Williams  ............. A63F 13/235
                                                                                                 3/235

\* cited by examiner

IDENTIFICATION APPARATUS

BACKGROUND OF THE INVENTION

1. Field of the Invention

This invention relates to an identification apparatus which can identify an ID of an identification object such as a play piece or a card.

2. Description of the Background Art

In the background art, there has been known a toy in which an ID is given to an identification object such as a play piece or a card so that an identification apparatus can identify the ID so as to execute a predetermined operation.

For example, in JP-A-2013-000581, there has been described a configuration in which corresponding pieces of type information are given to toy objects such as trading cards, figures and plastic models respectively so that a game apparatus can read each of the pieces of type information so as to output a predetermined sound or display. Incidentally, in JP-A-2013-00581, there has been description that barcodes or RFIDs are used as identification information to be read.

However, the barcodes have a fault in weakness to water or abrasion. In addition, there is another problem that the external appearance may be affected by a region which must be allocated for printing the barcodes.

In this respect, the problem caused by the barcodes does not occur if the RFIDs are used. However, since the apparatus using the RFIDs is expensive, a more inexpensive identification apparatus is required in the fields of toys etc. having lots of restrictions on manufacturing cost.

In consideration of the aforementioned situation, the present inventor has invented an identification apparatus described in Japanese Patent No. 5633858. The identification apparatus can identify a recognition pattern in the following manner. That is, the recognition pattern which is formed by connecting a plurality of conductive spots through conductive lines is provided in an identification object. When the recognition pattern of the identification object is placed to face a sensor face of a body of the apparatus, sensor electrodes are electrically connected to one another by the recognition pattern to thereby cause a change of electrostatic capacitance. By the change of electrostatic capacitance, the identification apparatus can identify the recognition pattern.

SUMMARY OF THE INVENTION

The present invention has been achieved as a further improvement of the aforementioned invention described in Japanese Patent No. 5633858. An object of the present invention is to provide an identification apparatus which is improved in terms of the degree of freedom for design without spoiling an advantage that the identification apparatus can be inexpensively manufactured.

The present invention has been accomplished in order to attain the aforementioned object. The present invention is characterized as follows.

According to a first configuration of the invention, there is provided an identification apparatus for reading an ID of an identification object, including: a sensor face in which a plurality of sensor electrodes serving for detecting a change of electrostatic capacitance, and a ground portion provided separately from the sensor electrodes are provided on one and the same plane; wherein: a conductive portion or conductive portions formed in the identification object is configured so that when the identification object is placed on the sensor face, the conductive portion or the conductive portions can electrically connect a corresponding one or corresponding ones of the sensor electrodes with the ground portion; and a change of electrostatic capacitance occurring when the corresponding sensor electrode or electrodes are electrically connected with the ground portion is detected so that the ID of the identification object can be identified.

According to a second configuration of the invention, a change of electrostatic capacitance in the ground portion can be detected, in addition to the aforementioned feature of the first configuration of the invention.

According to a third configuration of the invention, the identification object is configured so that when the identification object is rotated and then placed on the sensor face, a different ID can be identified, in addition to the aforementioned feature of the first or second configuration of the invention.

According to a fourth configuration of the invention, the identification object is configured so that when the identification object is reversed and then placed on the sensor face, a different ID can be identified, in addition to the aforementioned feature of any of the first through third configurations of the invention.

According to the first configuration of the invention as described above, the identification apparatus is provided with the sensor face in which the sensor electrodes and the ground portion are provided on one and the same plane. The conductive portion or the conductive portions formed in the identification object are configured so that when the identification object is placed on the sensor face, the conductive portion or the conductive portions can electrically connect the corresponding one or the corresponding ones of the sensor electrodes with the ground portion. The change of electrostatic capacitance occurring when the corresponding sensor electrode or electrodes are electrically connected with the ground portion is detected so that the ID of the identification object can be identified.

According to such a configuration, a recognition pattern can be identified by a combination of the sensor electrodes detecting the change of electrostatic capacitance. Accordingly, the identification apparatus can be manufactured inexpensively by use of the electrostatic capacitance sensors. In addition, due to the use of the electrostatic capacitance sensors, a front surface of the recognition pattern of the identification object can be covered with an insulator (paper, synthetic resin, or the like). Consequently, the ID can be given to the identification object without affecting the external appearance of the identification object.

Moreover, differently from the invention described in Japanese Patent No. 5633858, it is unnecessary to electrically connect the plurality of sensor electrodes to one another. Accordingly, the change of electrostatic capacitance can be also detected, for example, by only one sensor electrode. Thus, the degree of freedom for design can be improved.

In addition, the recognition pattern provided in the identification object can be also simplified (it is unnecessary to connect the conductive portions through conductive lines as in the invention described in Japanese Patent No. 5633858). Accordingly, it is possible to manufacture the identification object inexpensively and it is possible to improve the degree of freedom for the recognition pattern of the identification object.

In addition, according to the second configuration of the invention as described above, configuration may be made so that the change of electrostatic capacitance in the ground portion can be detected. With this configuration, even when the sensor electrodes have detected the change of electrostatic capacitance by mistake, an incorrect operation can be prevented by viewing the change of electrostatic capacitance in the ground portion.

In addition, according to the third configuration of the invention as described above, the identification object may be configured so that when the identification object is rotated and then placed on the sensor face, a different ID can be identified. With this configuration, a different operation can be performed using one and the same identification object. Thus, variation in a toy etc. can be made rich.

In addition, according to the fourth configuration of the invention as described above, the identification object may be configured so that when the identification object is reversed and then placed on the sensor face, a different ID can be identified. With this configuration, a different operation can be performed using one and the same identification object. Thus, variation in a toy etc. can be made rich.

DETAILED DESCRIPTION OF THE INVENTION

An embodiment of the invention will be described with reference to the drawings.

Figure 1:
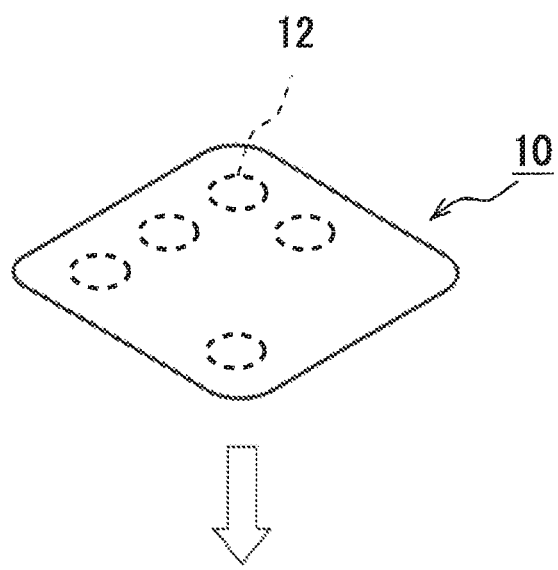
FIG. 1 is a view of the external appearance of an identification apparatus.
Figure 1:
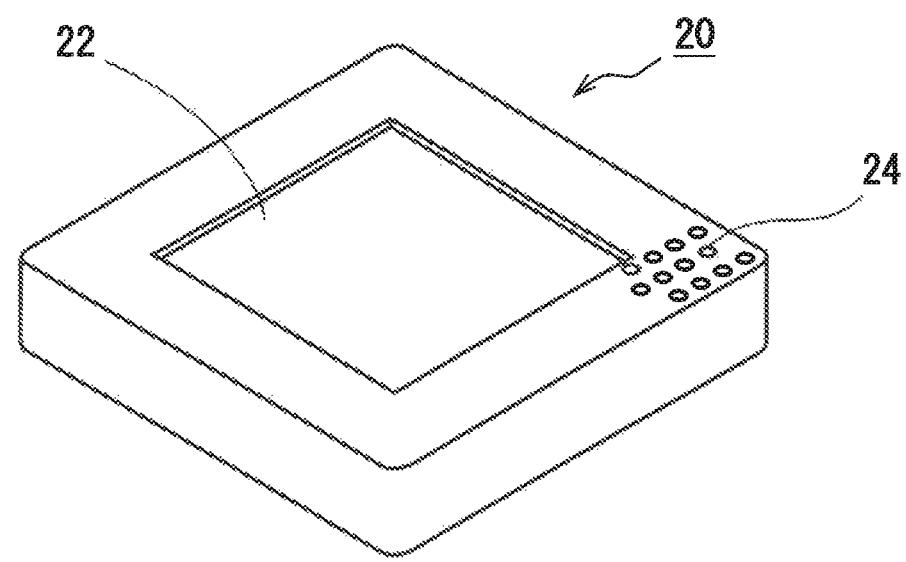

As shown in FIG. 1, an identification system according to the embodiment is provided with an identification object 10 such as a play piece or a card, and an identification apparatus 20 for identifying an ID of the identification object 10.

One or more conductive portions 12 are formed in the identification object 10. The conductive portions 12 are one or more flat conductive regions disposed at intervals relatively to one another. The conductive portions 12 are formed so that when the identification object 10 is placed on a sensor face 22 which will be described later, the conductive portions 12 can face corresponding ones of sensor electrodes 23 which will be described later. The layout (positions and the number) of the conductive portions 12 varies depending on the ID of the identification object 10. Thus, a recognition pattern is formed by the layout of the conductive portions 12. Accordingly, the recognition pattern can be used as the ID of the identification object 10. The conductive portions 12 are made of a conductive material. Thus, the conductive portions 12 can electrically connect the sensor electrodes 2 which will be described later, with a ground portion 24.

Incidentally, the identification object 10 can be formed, for example, into a card shape. The card-shaped identification object 10 may be manufacture, for example, in such a manner that a sheet where the conductive portions 12 have been formed is interposed between two surface members or that the conductive portions 12 are formed on a back side of one surface member and the other surface member is then attached thereto.

In addition, the identification object 10 may be formed in such a manner that a sheet where the conductive portions 12 have been formed is attached to a thin play piece (a play piece such as a coin or a medal) made of plastics or the like. On this occasion, a front surface or a back surface of the sheet in which the conductive portions 12 have been formed may be covered with a surface member.

In addition, the conductive portions 12 may be formed by printing in conductive ink etc. or may be formed by attaching a punched-out conductive thin piece (a metal piece such as aluminum foil).

In addition, each of the surface members may be made of an insulator such as paper or synthetic resin. A desired symbol etc. can be disposed in a front surface of the surface member. When such a surface member is used, a user can view the symbol and tell the identification object 10. In addition, since the conductive portions 12 are covered with the surface member, the conductive portions 12 cannot be visually recognized from the outside.

Figure 2A:
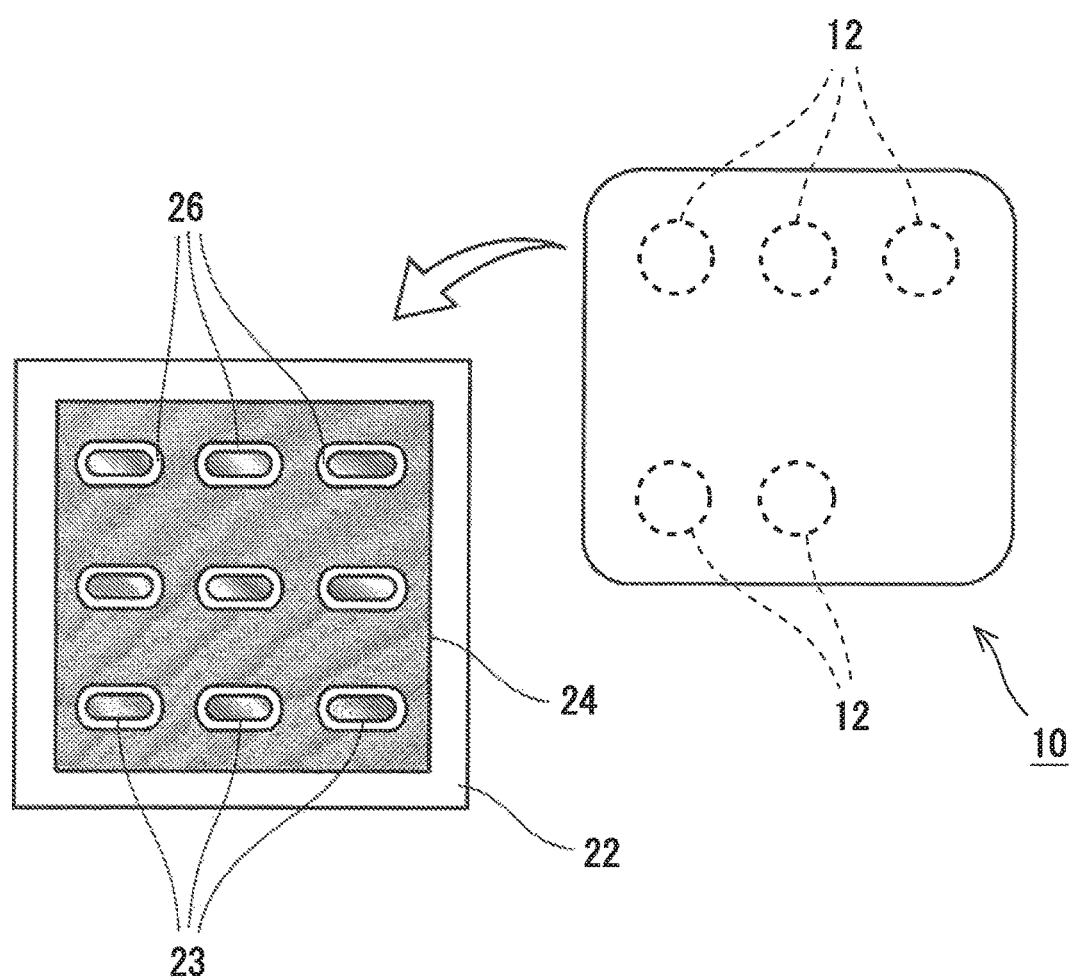
FIG. 2A is an explanatory view of a sensor face and an identification object.

As shown in FIG. 1, the identification apparatus 20 is provided with the sensor face 22 for placing the identification object 10 thereon. As shown in FIG. 2A, the plurality of sensor electrodes 23 for detecting a change of electrostatic capacitance are disposed on a back side of the sensor face 22. A front surface of the sensor face 22 is made of a plate-like insulator of paper, synthetic resin, glass, or the like. The sensor electrodes 23 are covered with the front surface of the sensor face 22 so that the sensor electrodes 23 cannot be touched directly.

Figure 3:
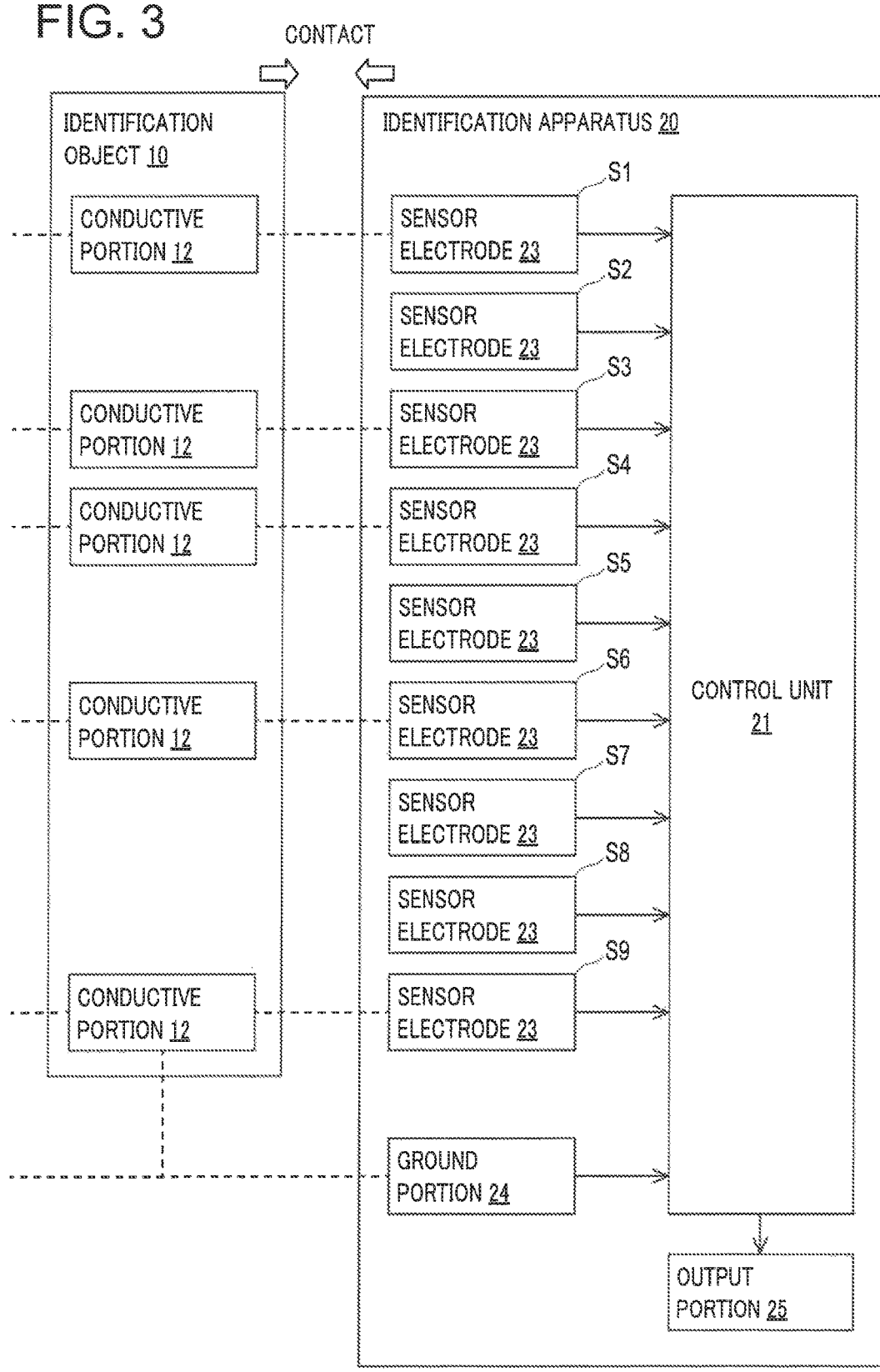
FIG. 3 is a block diagram showing the internal structure of the identification apparatus.

In addition, as shown in FIG. 3, a control unit 21 for controlling operation of the identification apparatus 20 and an output portion 25 for performing a predetermined op a on based on a signal from the control unit 21 are built in the identification apparatus 20.

The control unit 21 has a CPU function or an ROM function. For example, the control unit 21 is a one-chip microcomputer type device. The control unit 21 reads a program stored in the ROM to execute various kinds of control. Specifically, the control unit 21 according to the embodiment monitors a change of electrostatic capacitance in the aforementioned sensor electrodes 23 and monitors whether the change of electrostatic capacitance exceeding a predetermined threshold has occurred in any of the sensor electrodes 23 or not. When the change of electrostatic capacitance exceeding the predetermined threshold is detected, the control unit specifies one sensor electrode 23 or a plurality of sensor electrodes 23 causing the change of electrostatic capacitance. The control unit 21 identifies the recognition pattern (i.e. the ID) of the identification object 10 according to the specified sensor electrode 23 or a combination of the specified sensor electrodes 23.

The output portion 25 is an audio output device such as a speaker. Incidentally, the output portion 25 is not limited to the audio output device but may be a visual display device such as an LED or a liquid crystal display. The output portion 25 executes a predetermined output operation in accordance with a signal from the control unit 21. When, for example, the control unit 21 recognizes the identification object 10, the output portion 25 outputs sound corresponding to the identification object 10.

As shown in FIG. 2A, the identification apparatus according to the embodiment is provided with nine sensor electrodes 23. The nine sensor electrodes 23 are provided independently of one another. When, for example, a person touches a sensor electrode 23 to bring the sensor electrode 23 into a grounded state, a change of electrostatic capacitance can be detected. In the embodiment, however, electrostatic capacitance is changed not by the person touching the sensor electrode 23 but by the recognition pattern of the identification object 10 which is placed to face the sensor face 22. In this manner, the change of the electrostatic capacitance can be detected not through a human body.

The ground portion 24 is provided separately from the sensor electrodes 23 and around the sensor electrodes 23. The ground portion 24 is provided on one and the same plane as the sensor electrodes 23 in the sensor face 22. The ground portion 24 is provided to surround the sensor electrodes 23. In the embodiment, non-conductive portions 26 are formed with a predetermined width to surround the circumferences of the sensor electrodes 23 respectively, and the ground portion 24 is provided outside the non-conductive portions 26.

Incidentally, the ground portion 24 according to the embodiment is made of a reticulated (mesh-patterned) conductive material. For example, a mesh-patterned ground is formed at a fixed interval from the sensor electrodes 23 on a front surface of a substrate where the sensor electrodes 23 are provided and disposed. However, the ground portion 24 is not limited to the mesh-patterned conductive material but may be made of a solid conductive material or a linear conductive material.

In addition, only one ground portion 24 according to the embodiment is provided in the sensor face 22. The sensor electrodes 23 share and use the one ground portion 24. When the ground portion 24 is shared and used in this manner, the change of electrostatic capacitance can be detected easily and the structure can be made simple. However, the ground portion 24 is not limited to such a form but a plurality of ground portions 24 may be provided alternatively. For example, one ground portion 24 may be provided for each row or one ground portion 24 may be provided for each sensor electrode 23.

When the ground portion 24 and the sensor electrodes 23 are electrically connected, an electric current flows from the sensor electrodes 23 toward the ground portion 24. Therefore, a change of electrostatic capacitance occurs.

Figure 2B:
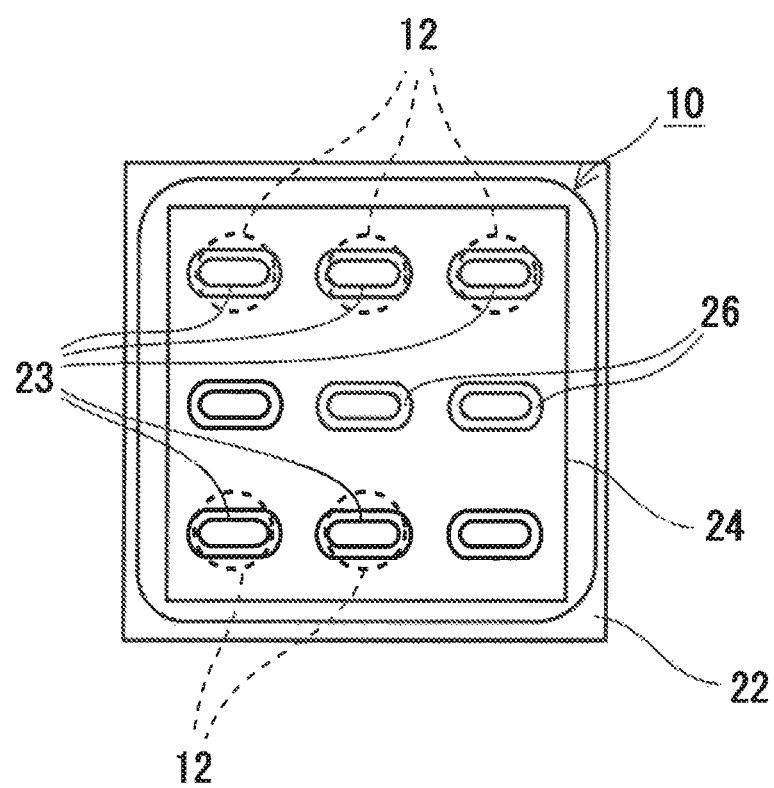
FIG. 2B is an explanatory view of a state in which the identification object is placed on the sensor face.

That is, as shown in FIG. 2A, the conductive portions 12 of the identification object 10 are disposed in positions corresponding to the sensor electrodes 23 of the sensor face 22. The number of the conductive portions 12 disposed thus is up to the number (nine) of the sensor electrodes 23. The layout and the number of the conductive portions 12 vary from one identification object 10 to another as shown in FIGS. 4A to 4H. By the layout and the number of the conductive portions 12 which are varied in this manner, each recognition pattern can be formed. When each of the identification objects 10 is mounted on the sensor face 22 to face the sensor face 22 of the identification apparatus 20, the sensor electrodes 23 are connected with the ground portion 24 by the conductive portions 12, as shown in FIG. 2B. Specifically, one conductive portion 12 is laid on one corresponding sensor electrode 23 and the ground portion 24 simultaneously. In other words, the one conductive portion 12 extends across one corresponding non-conductive portion 26 so as to electrically connect the one corresponding sensor electrode 23 with the ground portion 24.

In an example shown in FIG. 3, of the nine sensor electrodes 23 designated by S1 to S9, S1, S3, S4, S6 and S9 are electrically connected with the ground portion 24. When the sensor electrodes 23 are electrically connected with the ground portion 24 in this manner, an electrically current flows from the sensor electrodes 23 toward the ground portion 24. Accordingly, a change of electrostatic capacitance occurs in the sensor electrodes 23. In this manner, the sensor electrodes 23 in which the change of electrostatic capacitance has occurred are detected by the control unit 21. Accordingly, a recognition pattern can be identified by a combination of the detected sensor electrodes 23. According to such an identification method, possible to create IDs as many as the number of combinations for the layout and the number of the conductive portions 12.

Incidentally, in the embodiment, the control unit 21 can also detect a change of electrostatic capacitance in the ground portion 24, as shown in FIG. 3. Therefore, the control unit 21 can detect the change of electrostatic capacitance more surely than when only the change of electrostatic capacitance in the sensor electrodes 23 is checked. However, the recognition pattern of the identification object 10 can be read even without detecting the change of electrostatic capacitance in the ground portion 24. Accordingly, it is not essential to check the electrostatic capacitance in the ground portion 24. Accordingly, the control unit 21 may be designed not to check the change of electrostatic capacitance in the ground portion 24 but to only check the change of electrostatic capacitance in the sensor electrodes 23. When the change of electrostatic capacitance in the ground portion 24 is not checked, it is not necessary to connect the ground portion 24 to the control unit 21.

Figure 4A:
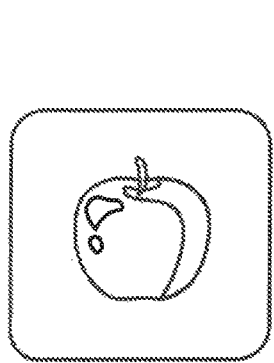
FIGS. 4A to 4H are views showing examples of identification objects, FIG. 4A being a front view of a first identification object, FIG. 4B being a view showing a recognition pattern of the first identification object, FIG. 4C being a front view of a second identification object, FIG. 4D being a view showing a recognition pattern of the second identification object, FIG. 4E being a front view of a third identification object, FIG. 4F being a view showing a recognition pattern of the third identification object, FIG. 4G being a front view of a fourth identification object, FIG. 4H being a view showing a recognition pattern of the fourth identification object.
Figure 4B:
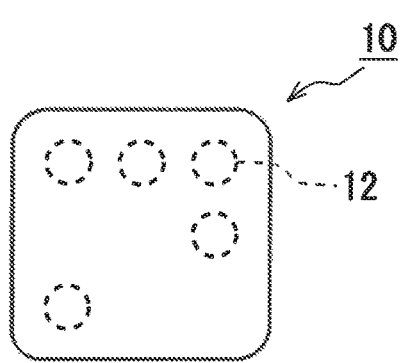
Figure 4C:
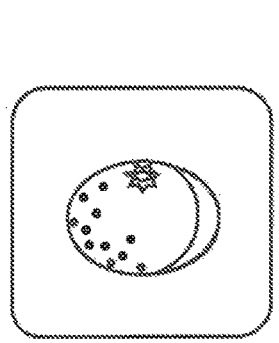
Figure 4D:
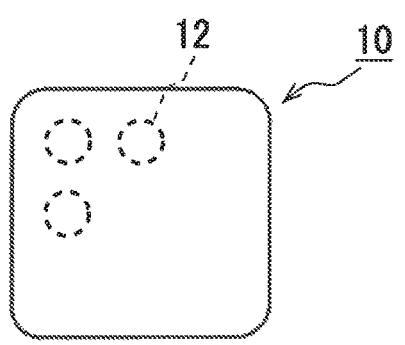
Figure 4E:
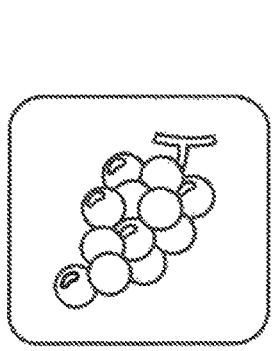
Figure 4F:
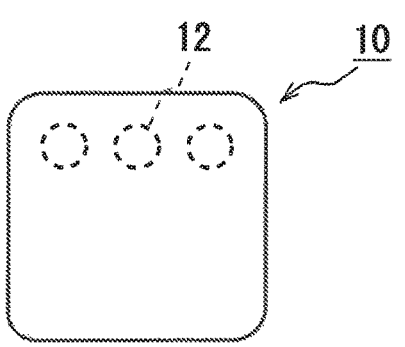
Figure 4G:
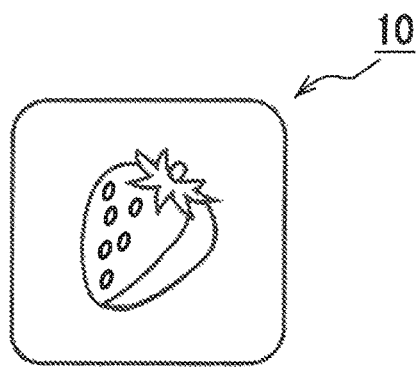
Figure 4H:
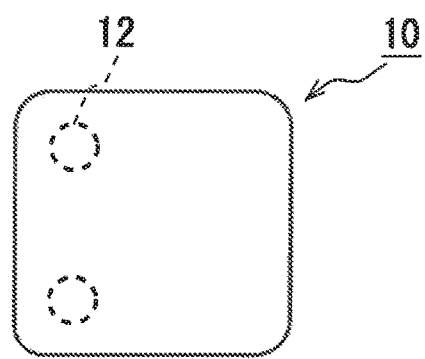

For example, the invention can be applied to a toy shown in FIGS. 4A to 4H. In the application example shown in FIGS. 4A to 4H, cards with fruits drawn therein are prepared as identification objects 10. When each of the cards is placed on the sensor face 22 of the identification apparatus 20, the name of the fruit drawn in the card is pronounced from the output portion 25. That is, configuration can be made in such a manner that different recognition patterns are given to the cards displaying different kinds of fruits respectively and voices are outputted correspondingly to the cards, as shown in FIGS. 4A to 4H. Specifically, configuration can be made in such a manner that when a card shown in FIG. 4A is placed on the sensor face 22, a recognition pattern shown in FIG. 4B is identified and a voice "apple" is outputted from the output portion 25.

Next, modifications of the embodiment will be described.

Figure 5A:
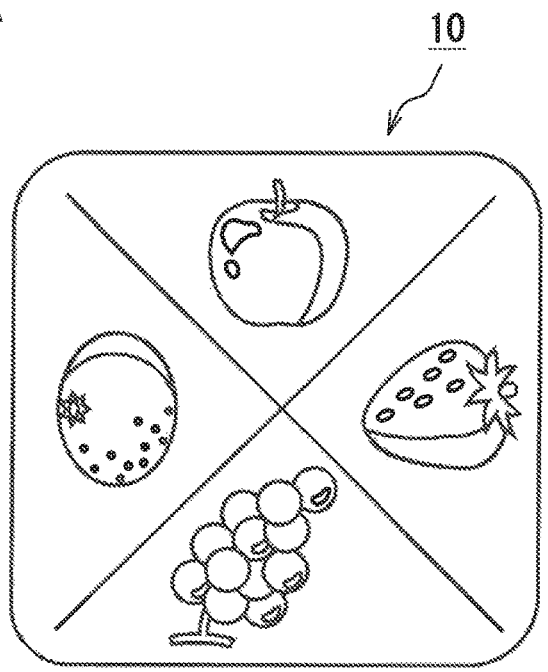
FIGS. 5A and 5B are views showing a first modification, FIG. 5A being a front view of an identification object, FIG. 5B being a view showing a recognition pattern of the identification object.
Figure 5B:
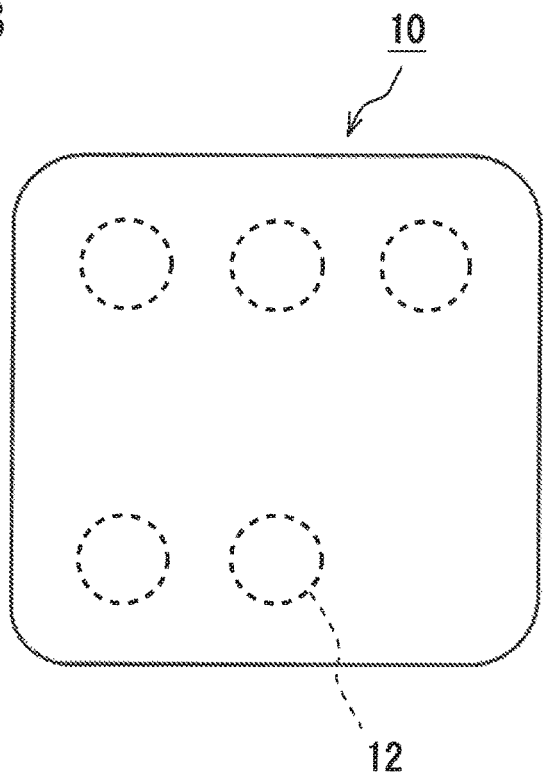
Figure 6A:
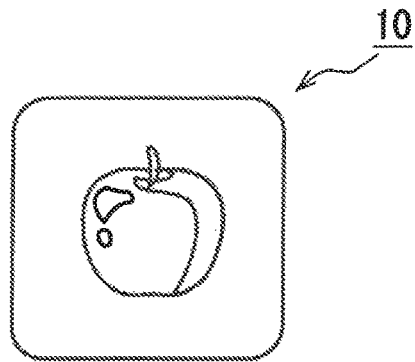
FIGS. 6A to 6D are views showing a second modification, FIG. 6A being a front view of an identification object, FIG. 6B being a view showing a recognition pattern of the identification object when the front surface of the identification object faces up, FIG. 6C being a back view of the identification object, FIG. 6D being a view showing the recognition pattern of the identification object when the back surface of the identification object faces up.
Figure 6B:
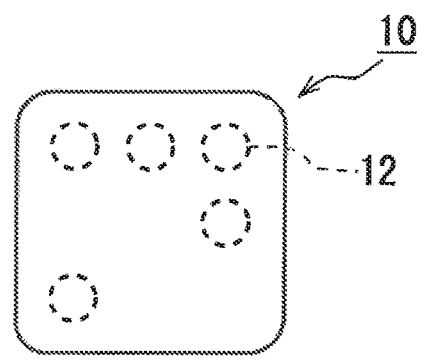
Figure 6C:
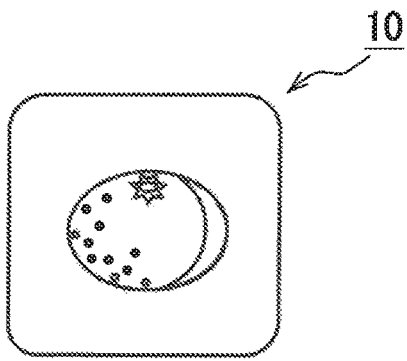
Figure 6D:
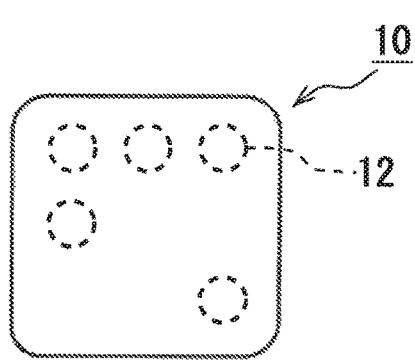

FIGS. 5A and 5B are views showing a modification of the identification object 10. According to the configuration of the modification shown in FIGS. 5A and 5B, when one and the same identification object 10 is rotated and then placed on the sensor face 22, a different identification result is obtained by the identification apparatus 20 (a different ID is identified). Thus, the identification apparatus 20 executes different operations in accordance with respective identification results. For example, in the case of a card in which a drawing of fruits is displayed in the front surface, as shown in FIGS. 5A and 5B, different voices may be outputted in accordance with respective angles at which the card is placed on the sensor face 22. Specifically, the configuration may be arranged as follows. That is, when the card is placed on the sensor face 22 so that a drawing of an apple is located in an upper part of the card, a voice "apple" is outputted. When the card is placed on the sensor face 22 so that a drawing of a mandarin is located in an upper part of the card, a voice "mandarin" is outputted. When the card is placed on the sensor face 22 so that a drawing of grapes is located in an upper part of the card, a voice "grapes" is outputted. When the card is placed on the sensor face 22 so that a drawing of a strawberry is located in an upper part of the card, a voice "strawberry" is outputted.

FIGS. 6A to 6D are views showing another modification of the identification object 10. According to the configuration of the modification shown in FIGS. 6A to 6D, when one and the same identification object 10 is reversed and then placed on the sensor face 22, a different identification result is obtained by the identification apparatus 20 (a different ID is identified). Thus, the identification apparatus 20 performs different operations in accordance with respective identification results. For example, in the case of a card in which the drawing of a fruit displayed in the front surface is different from the drawing of a fruit displayed in the back surface as shown in FIGS. 6A to 6D, configuration may be made so that different voices can be outputted in accordance with the respective up-facing surfaces of the card placed on the sensor face 22. Specifically, the configuration may be arranged as follows. That is, when the card with the drawing of an apple facing up is placed on the sensor face 22, a voice "apple" is outputted. When the card with drawing of a mandarin facing up is placed on the sensor face 22, a voice "mandarin" is outputted.

Although the aforementioned embodiment has been described using the card-like identification object 10 as an example, the embodiment of the invention is not limited thereto. For example, a three-dimensional identification object 10 such as a doll figure may be used. In the case where such a three-dimensional identification object 10 is used, a recognition pattern may be formed in its bottom portion etc. Then the recognition pattern is formed thus, for example, play piece used in a board game etc. can be used as the identification object 10 and a board surface of the board game can be configured as the identification apparatus 20. Thus, when the play piece is simply placed on the board surface of the board game, the recognition pattern of the play piece can be read so that a voice etc. corresponding to the play piece can be also outputted.

In addition, the identification apparatus 20 may be a transformation belt toy while a medal, a key, or the like, mounted on the transformation belt toy is used as the identification object 10. With this configuration, when a predetermined medal or key or the like is mounted on the transformation belt toy, a sound effect may be generated. In addition, when the medal or key or the like mounted on the transformation belt toy is rotated, another recognition pattern may be read so that a unique sound effect can be generated.

Figure 7A:
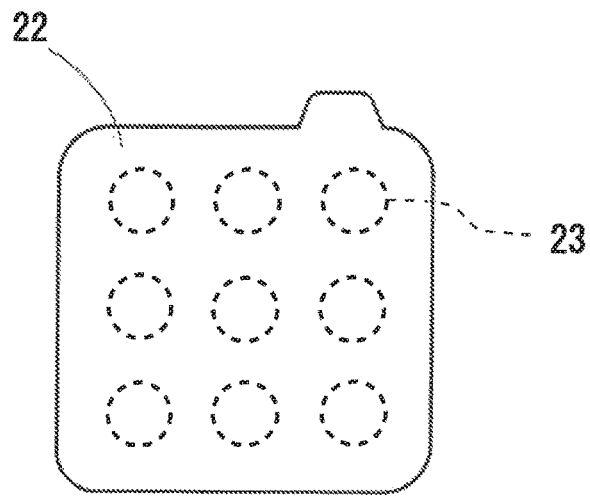
FIG. 7A is a view showing a sensor face 22 according to a third modification.
Figure 7B:
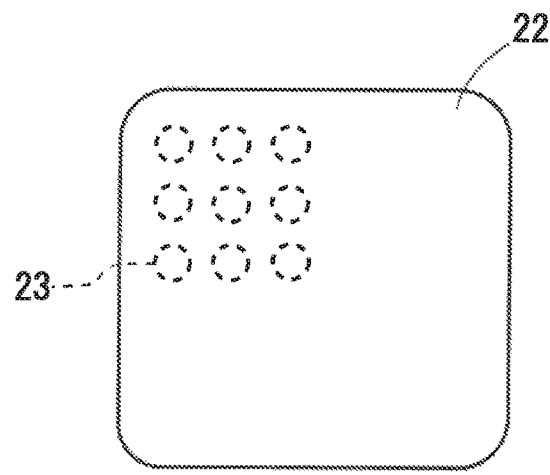
FIG. 7B is a view showing a sensor face 22 according to a fourth modification.
Figure 7C:
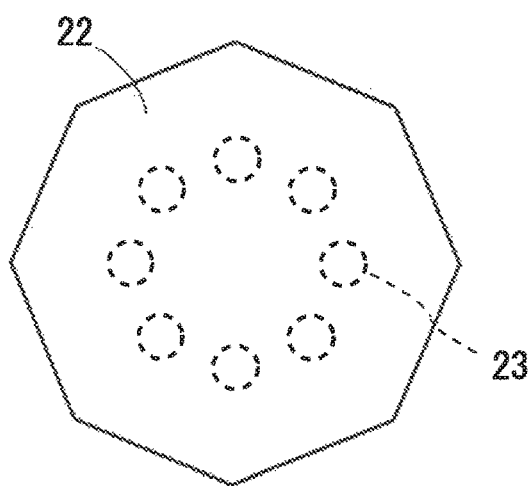
FIG. 7C is a view showing a sensor face 22 according to a fifth modification.

Incidentally, the shape of the sensor face 22 or the layout of the sensor electrodes 23 is not limited to a square shape as shown in FIG. 1, but can be arranged variously in accordance with the aim. For example, the shape of the sensor face 22 may be formed as an asymmetric shape, as shown in FIG. 7A. When a mount face of an identification object 10 is formed to be consistent with the asymmetric shape, the identification object 10 can be set only in a predetermined direction. Accordingly, the identification object 10 can be prevented from being set in a wrong direction. In addition, when the sensor electrodes 23 are arranged to lean in a predetermined direction of the sensor face 22 as shown in FIG. 7B, the recognition pattern can be prevented from being read if the identification object 10 is set in a wrong direction. Accordingly, the recognition pattern may be identified to output a correct answer sound only when, for example, the identification object 10 is set in a predetermined direction in an intellectual training toy etc. In addition, in the case where the sensor electrodes 23 are arranged to form a circular shape or an arc shape as shown in FIG. 7C, different identification results can be obtained from the identification object 10 which is rotated little by little. Thus, for example, a toy in which a story can be developed by rotation of the identification object 10 may be manufactured.

According to the embodiment as described above, the identification apparatus 20 is provided with the sensor face 22 in which the plurality of sensor electrodes 23 and the ground portion 24 are provided on one and the same plane. The conductive portions 12 formed in the identification object 10 are configured so that when the identification object 10 is placed on the sensor face 22, the conductive portions 12 can electrically connect the sensor electrodes 23 with the ground portion 24. The change of electrostatic capacitance occurring when the sensor electrodes 23 are electrically connected with the ground portion 24 is detected so that the ID of the identification object 10 can be identified.

According to such a configuration, each recognition pattern can be identified by a combination of the sensor electrodes 23 detecting the change of electrostatic capacitance. Accordingly, the identification apparatus 20 can be manufactured inexpensively by use of the electrostatic capacitance sensors. In addition, due to the use of the electrostatic capacitance sensors, the front surface of the recognition pattern of the identification object 10 can be covered with an insulator (paper, synthetic resin, or the like). Accordingly, an ID can be given to the identification object 10 without affecting the external appearance of the identification object 10.

In addition, the change of electrostatic capacitance can be detected by only one sensor electrode 23. Accordingly, the degree of freedom for design can be improved.

In addition, configuration may be made so that the change of electrostatic capacitance in the ground portion 24 can be detected. With this configuration, even when the sensor electrodes 23 has detected the change of electrostatic capacitance by mistake, an or e t operation can be prevented by viewing the change of electrostatic capacitance in the ground portion 24.

In addition, the identification object 10 may be configured so that when the identification object 10 is rotated and then placed on the sensor face 22, a different ID can be identified. With this configuration, a different operation can be performed using one and the same identification object 10. Thus, variation in the toy etc. can be made rich.

In addition, the identification object 10 may be configured so that when the identification object 10 is reversed and then placed on the sensor face 22, a different ID can be identified. With this configuration, a different operation can be performed using one and the same identification object 10. Thus, variation in the toy etc. can be made rich.

What is claimed is:

1. An identification apparatus for reading an ID of an identification object, comprising:
   a sensor face in which a plurality of sensor electrodes serving for detecting a change of electrostatic capacitance, and a ground portion provided separately from the sensor electrodes are provided on one and the same plane; wherein:
   a conductive portion or conductive portions formed in the identification object is configured so that when the identification object is placed on the sensor face, the conductive portion or the conductive portions can electrically connect a corresponding one or corresponding ones of the sensor electrodes with the ground portion; and
   a change of electrostatic capacitance occurring when the corresponding sensor electrode or electrodes are electrically connected with the ground portion is detected so that the ID of the identification object can be identified.

2. An identification apparatus according to claim 1, wherein: a change of electrostatic capacitance in the ground portion can be detected.

3. An identification apparatus according to claim 2, wherein: the identification object is configured so that when the identification object is rotated and then placed on the sensor face, a different ID can be identified.

4. An identification apparatus according to claim 3, wherein:
   configuration is made so that when the identification object is reversed and then placed on the sensor face, a different ID can be identified.

5. An identification apparatus according to claim 2, wherein:
   configuration is made so that when the identification object is reversed and then placed on the sensor face, a different ID can be identified.

6. An identification apparatus according to claim 1, wherein: the identification object is configured so that when the identification object is rotated and then placed on the sensor face, a different ID can be identified.

7. An identification apparatus according to claim 6, wherein:
   configuration is made so that when the identification object is reversed and then placed on the sensor face, a different ID can be identified.

8. An identification apparatus according to claim 1, wherein: configuration is made so that when the identification object is reversed and then placed on the sensor face, a different ID can be identified.

* * * * *